No. 806,462. PATENTED DEC. 5, 1905.
N. A. CHRISTENSEN.
AUTOMATIC CONTROLLER FOR ELECTRICALLY ACTUATED COMPRESSORS.
APPLICATION FILED MAY 13, 1898.
4 SHEETS—SHEET 3.
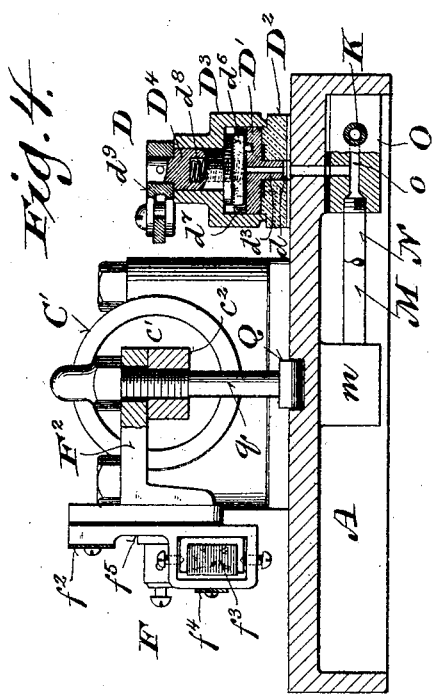
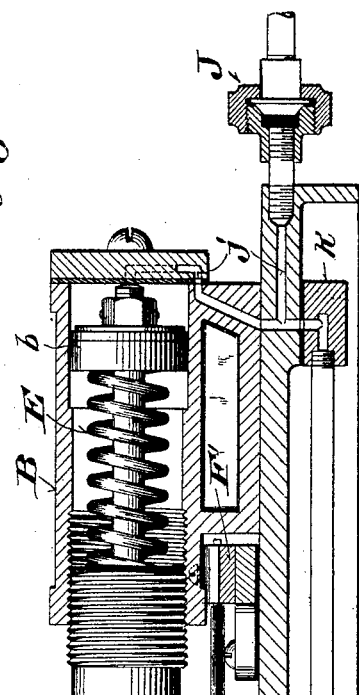
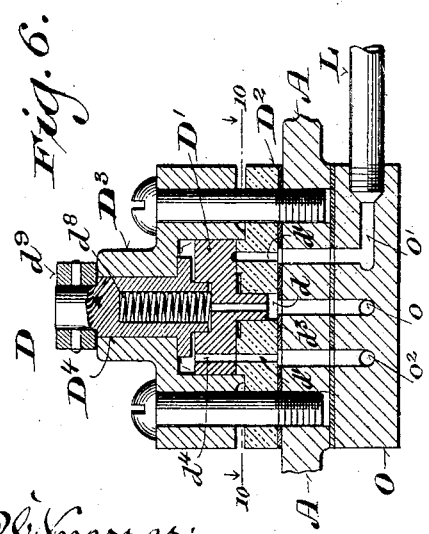
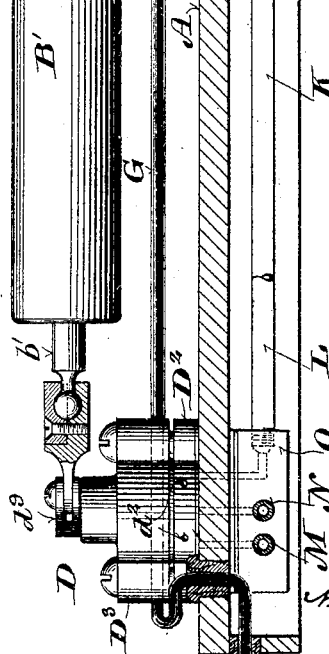

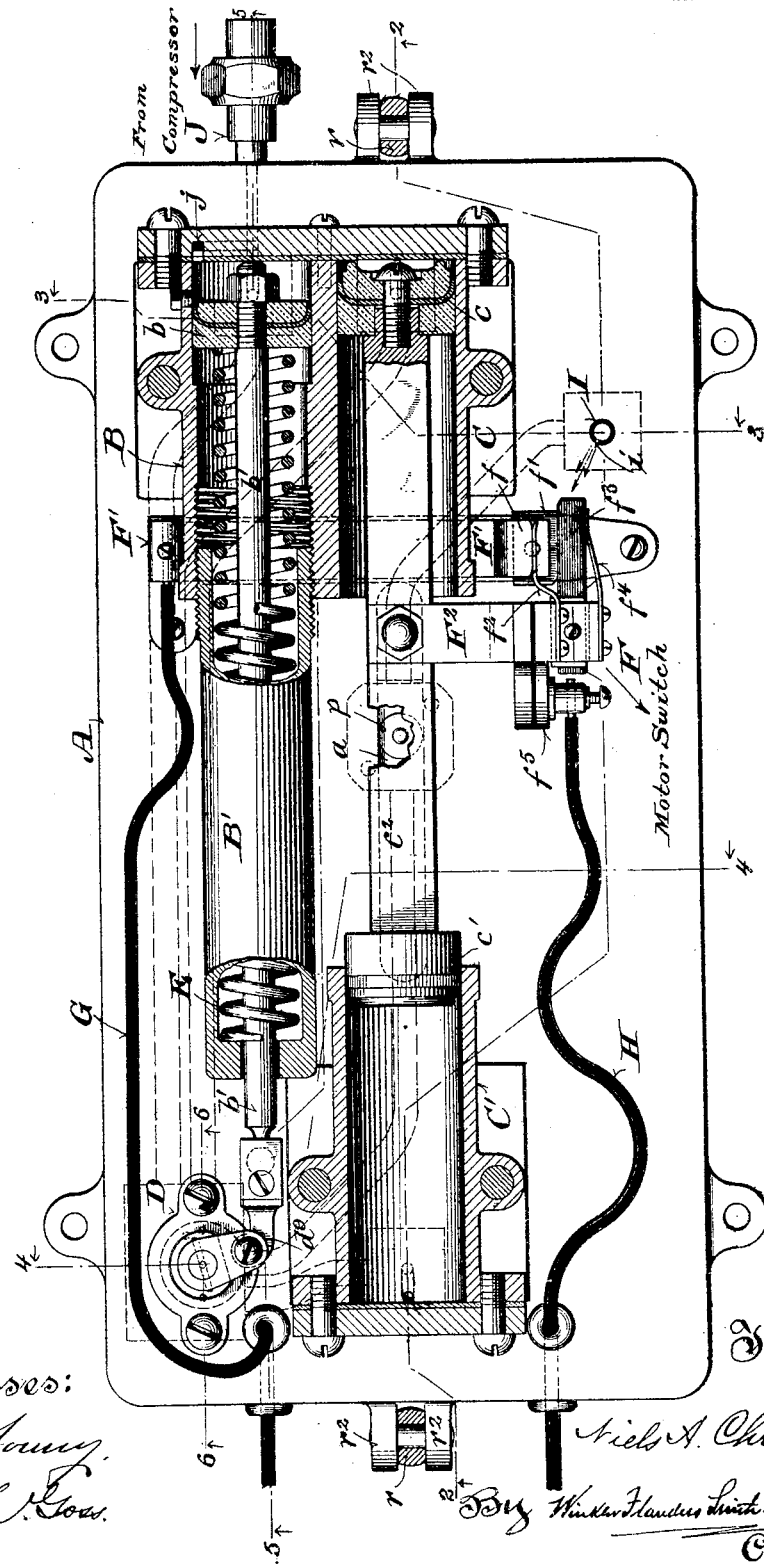

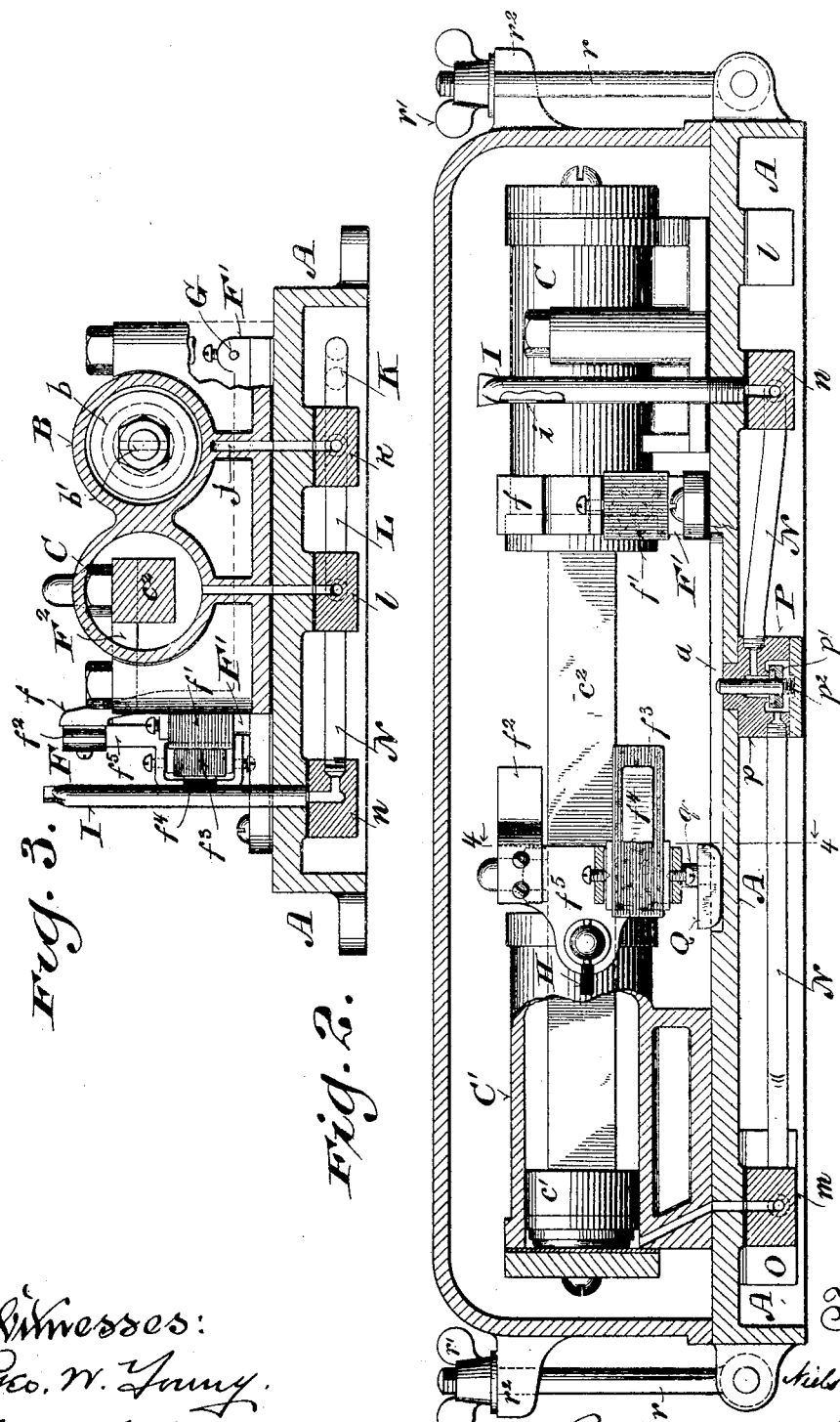

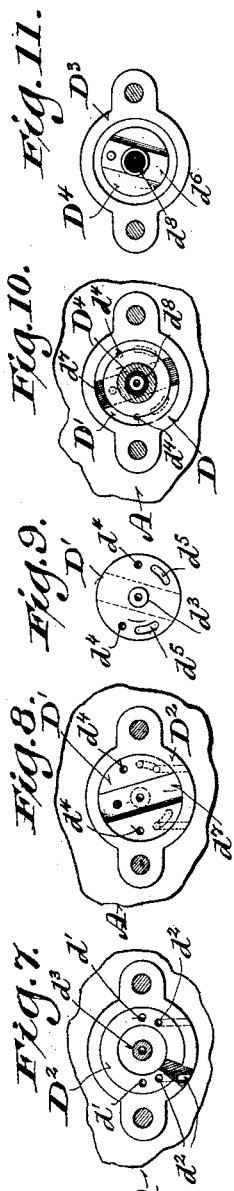
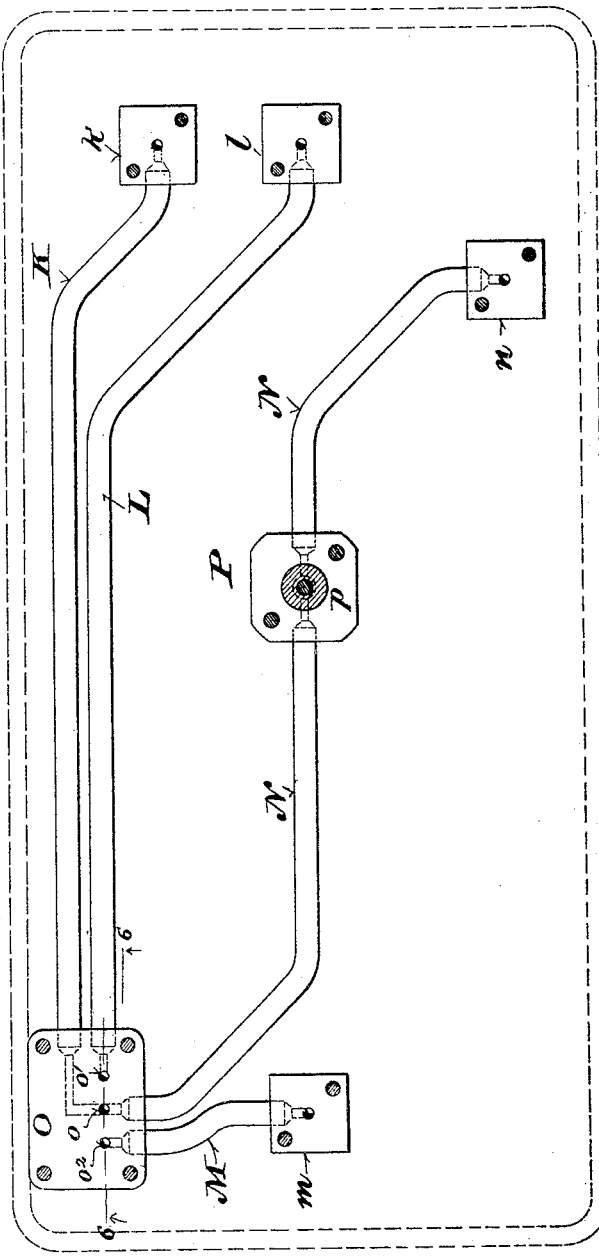

UNITED STATES PATENT OFFICE.

NIELS ANTON CHRISTENSEN, OF MILWAUKEE, WISCONSIN.

AUTOMATIC CONTROLLER FOR ELECTRICALLY-ACTUATED COMPRESSORS.

No. 806,462.

Specification of Letters Patent.

Patented Dec. 5, 1905.

Application filed May 13, 1898. Serial No. 680,536.

*To all whom it may concern:*

Be it known that I, NIELS ANTON CHRISTENSEN, a subject of the King of Denmark, residing at Milwaukee, in the county of Milwaukee and State of Wisconsin, have invented certain new and useful Improvements in Automatic Controllers for Electrically-Actuated Compressors, of which the following is a specification, reference being had to the accompanying drawings, forming a part thereof.

The main object of my invention is to automatically break and close the circuit of an electric motor employed to operate a compressor when the fluid-pressure produced by the compressor rises above and falls below a predetermined point or limits.

It consists in certain novel features of construction and combinations of parts hereinafter particularly described, and pointed out in the claims.

In the accompanying drawings like letters designate the same parts in the several figures.

Figure 1 is a front elevation of a controller embodying my invention, the cover being removed and certain parts being shown in longitudinal section. Fig. 2 is a longitudinal section of the device on the line 2 2, Fig. 1. Fig. 3 is a cross-section on the line 3 3, Fig. 1. Fig. 4 is a similar section on the line 4 4, Figs. 1 and 2. Fig. 5 is a longitudinal section on the line 5 5, Fig. 1. Fig. 6 is an enlarged section on the line 6 6, Figs. 1 and 12, of the valve which controls the operation of the switch or cut-out. Figs. 7 to 11, inclusive, are detail views of said valve and associated parts, Fig. 7 being a plan view of the valve-seat, Fig. 8 a plan view of the valve and seat, Fig. 9 an inverted plan view of the valve, Fig. 10 a section on the line 10 10, Fig. 6, and Fig. 11 an inverted plan view of the valve-case cover and the valve-operating disk or stem; and Fig. 12 is a diagram or plan of the fluid-pressure connections below or behind the base-plate of the controller.

The device as shown in the accompanying drawings to illustrate my invention is specially designed for use in connection with an air-brake system on railway-cars in which compressed air is supplied by a compressor operated by an independent electric motor; but with little or no change the controller may be applied to other analogous uses.

Referring to the accompanying drawings, and particularly Figs. 1 to 5, inclusive, A designates a base-plate which may be conveniently made of cast-iron and adapted to be attached to a vertical wall in the position shown in Fig. 1. Upon the front or outer face of this base-plate are mounted longitudinally and parallel with each other cylinders B, C, and C'. The cylinders B and C are preferably arranged side by side, and the cylinders C and C' are arranged in line with each other at or near opposite ends of the base-plate, their inner ends being open. The cylinder B is provided with a piston $b$, and the cylinders C and C' are respectively provided with pistons $c$ and $c'$, which are connected with each other by a rod $c^2$.

D is a valve controlling the supply and release of compressed air or other actuating fluid the pressure of which the apparatus is designed to control to and from the cylinders C and C'. This valve, which is shown in section on an enlarged scale in Fig. 6, comprises the valve proper, D', which is of disk form, and a valve-case consisting of a seat $D^2$ and a cover $D^3$. The seat and cover are fastened together and to the base-plate A by screws, a sheet of rubber or other suitable packing material being interposed between the seat and base-plate to form an air-tight joint. The seat $D^2$ is formed with a central opening $d$, two service-ports $d'$ $d'$, and two exhaust-ports $d^2$ $d^2$, opening laterally to the atmosphere, as shown in Fig. 7. The valve D' is formed on its working face with a central stem $d^3$, which is fitted to turn in the opening $d$ of the valve-seat and has a passage through it opening on the upper or outer side of the valve-disk. It is also provided, as shown in Figs. 8 and 9, with two through-ports $d^4$ $d^4$ and on its working face next to the seat with two arc-shaped cavities $d^5$ $d^5$. These ports and cavities are so arranged that when the port $d^4$ on one side of the valve registers with the corresponding port $d'$ in the valve-seat the cavity $d^5$ on the other side of the valve will register with and connect the service and exhaust ports $d'$ and $d^2$ on that side, and vice versa.

$D^4$ is a valve-operating stem fitted to turn in a central opening in the cover $D^3$ and formed at its inner end with a disk, which is accurately fitted on its upper or outer face to the interior of the valve case or cover for preventing leakage around said stem. On its under or inner side said disk is formed with a cross rib or tongue $d^6$, which fits into and loosely engages a corresponding groove $d^7$ in the upper or outer face of the valve D', thus allowing said valve to bear evenly upon its seat without binding. A spring $d^8$, inserted in a socket formed therefor in the lower or inner end of the stem $D^4$, bears against the valve D' and holds it snugly against its seat. It also presses the disk on the stem $D^4$ in the opposite direction snugly against the opposing face of the valve case or cover $D^3$. The cross rib or tongue on the stem $D^4$ is provided, as shown in Fig. 11, with a dowel-pin which is adapted to engage with a corresponding hole in the valve D', as shown in Fig. 8, and thus insure the assembling of the valve-actuating connections in their proper relative positions. The upper or outer end of the stem $D^4$ is provided, as shown in Fig. 1, with an arm $d^9$, which is connected by a link with the rod b' of piston b.

In the inner end of the cylinder B is threaded a cylindrical extension B', having a contracted opening in its opposite end through which the piston-rod b' passes and is guided. E is a spiral spring placed on said piston-rod between the piston b and the opposite end of the cylindrical extension B', which serves as a case for said spring and affords means for adjusting its tension.

F designates the switch for controlling the motor-circuit. It comprises stationary and movable contacts connected with the two electric conductors G and H, one leading from the generator or source of current and the other to the motor. There are preferably two sets of contacts, one of metal and the other of carbon, so arranged that the carbon contacts will be the first to be brought into engagement with each other when the switch is closed and the last to be separated when the switch is opened. In this way the motor-circuit is opened and closed abruptly, a reliable metallic contact is provided, and provision is made to prevent injury to the metallic contacts by sparks or electric arcs when the circuit is broken.

f is the stationary metallic contact, with which the conductor G is connected. It is formed with or attached to a bracket or plate F', which is mounted upon and insulated from the base-plate A, as shown in Figs. 1, 2, 3, and 5.

f'' is a carbon block forming the other stationary contact. It is attached to the bracket F'.

$f^2$ is a spring forming the movable metallic contact. It is attached to and insulated from a bracket $F^2$, which is mounted on the piston-rod $c^2$.

$f^3$ is the movable carbon contact. It is pivotally connected with but insulated from the bracket $F^2$ in position to engage with the stationary contact f'' when the pistons c c' are moved to the right to close the switch, as shown in Fig. 1. A spring $f^4$ presses the contact $f^3$ toward the contact f' and holds it in yielding connection therewith when the switch is closed. The contact $f^3$ projects in advance of the metallic spring-contact $f^2$, so as to remain in engagement with the stationary carbon contact f'' after the metallic contact $f^2$ has cleared the contact f in opening the switch.

The conductor H is attached to the block or plate $f^5$, carrying the contacts $f^2$ and $f^3$ and connecting them with the bracket $F^2$.

I is a tube secured in an opening in the base-plate A and having a slot or opening i directed toward the working face of the stationary carbon contact f'', so that a blast of air issuing from said tube when the switch is opened will blow out the arc that is formed between the carbon contacts when they are separated from each other.

J is the main fluid-supply connection leading from the compressor or a reservoir into which it discharges to the controller. It communicates, through a passage j, with the outer end of the cylinder B. The compressed air or other fluid is conveyed from the passage j to the valve D and thence to and from the outer ends of the cylinders C and C' and to the blast-tube I by pipes or tubes K, L, M, and N, arranged in a recess in the bottom or back of the base-plate A and attached at their ends thereto by coupling-blocks k, l, m, n, and O, as shown in Fig. 12. The several blocks k, l, m, and n are formed with angular passages which communicate at one end through openings in the base-plate with the main supply-passage j, the outer ends of the cylinders C and C', and the blast-tube I, respectively. The block O is formed with three angular passages o, o', and $o^2$, which communicate at one end through openings in the base-plate with the opening d and the ports d' d', respectively, in the valve-seat $D^2$, as shown in Fig. 6. The tube K connects the passage in block k with the passage o in block O. The tube L connects the passage o' in block O with the passage in the block l. The tube M connects the passage $o^2$ in block O with the passage in the block m, and the tube N connects the passage o in block O with the passage in the block n.

P is a valve placed in the tube N and controlling the supply of air to the blast-tube I. As shown in Fig. 2, it comprises a valve-case p and valve p', which is held normally closed by a spring $p^2$. The valve-case has on the upper or outer side a neck which is fitted in an opening in the base-plate A, and through this neck the stem of the valve p' projects into a longitudinal groove a, formed in said base-plate below and parallel with the piston-rod $c^2$ and between the cylinders C and C'.

Q is a shoe or slide attached by a rod q to the piston-rod $c^2$ and adapted to traverse the groove a and in its passage over the stem of the valve $p'$ to momentarily open said valve and admit air or other fluid under pressure to the tube I whenever the contact $f^3$ is moving out of or into engagement with the contact $f'$.

The mechanism of the controller is inclosed and protected, as shown in Fig. 2, by a cover R, which is detachably secured to the base-plate A by screw-rods $r\ r$, pivoted at one end to said base-plate and provided with thumb-nuts $r'\ r'$, which are adapted to be engaged with forked lugs $r^2$ on said cover.

The controller operates as follows: When the switch F is closed and the parts of the mechanism are in the positions shown in Fig. 1, current being supplied to the motor through the conductors G and H, the compressor will be operated and supply air or other fluid under pressure to the controller through the connection J. If under these conditions the pressure in cylinder B rises sufficiently to overbalance the spring E, the piston $b$ will be moved to the left and the valve D' will be turned so as to permit compressed air or other actuating-fluid to pass through one of its ports $d^4$ into the corresponding port $d'$ of the valve-seat and thence through the passage $o'$ and tube L into the outer end of the cylinder C and at the same time to release the air contained in the cylinder C' through the tube M, passage $o^2$, the other port $d'$ in the valve-seat, the associated cavity $d^5$ in the valve, and the port $d^2$ to the atmosphere. When this occurs, the pistons $c$ and $c'$ will be instantly shifted to the left, carrying the contacts $f^2$ and $f^3$ of the switch F out of engagement with the contacts $f$ and $f'$, thereby breaking the circuit and stopping the motor and compressor. As the carbon contacts $f''$ and $f^3$ are separated in opening the switch the shoe Q passes over the stem of valve $p'$, momentarily opening said valve and allowing compressed air or other fluid to enter the tube I, and thus produce a blast through the orifice $i$ that will extinguish the arc produced by the separation of said contacts. The separation between the metal contacts $f$ and $f^2$ taking place before that of the carbon contacts prevents an arc between said metal contacts and the consequent burning and injury thereof. The arc which is or may be momentarily formed between the carbon contacts when they are separated in opening the switch is immediately extinguished by the blast from tube I and prevented from injuring said contacts, which on account of the nature of the material of which they are made are much less liable to destruction and injury than the metal contacts which, however, afford a better electrical connection. When the pressure falls to the limit for which the controller is adjusted, the spring E forces the piston $b$ back to the right, thereby reversing the valve D', which releases the actuating fluid from cylinder C and admits it to cylinder C' in the manner above explained. When this occurs, the pistons $c$ and $c'$ will be shifted back to the right, thereby closing the switch F and starting the motor and compressor. A substantially constant pressure in the reservoir supplied by the compressor will thus be maintained by the controller which will automatically break the circuit and stop the motor and compressor whenever the pressure rises above the limit for which the spring E is adjusted and will close the circuit and start the motor and compressor whenever the pressure falls below that limit. The controller may be adjusted to maintain any desired degree of pressure by increasing or diminishing the tension of the spring E, which is effected by screwing the spring-case B' in or out.

In place of any or all of the cylinders and pistons shown in the drawings their obvious equivalents—diaphragm-chambers and diaphragms—may be substituted, and by the term "cylinder" and "piston" as employed in the following claims I intend to include such equivalents.

Instead of two separate cylinders C C' and pistons $c$ and $c'$ I may employ a single cylinder and piston for operating the switch, although I prefer the construction and arrangement shown, whereby I am enabled to dispense with stuffing-boxes, which tend to make the moving parts bind and work hard and require frequent inspection and constant care to keep them in proper working order. I may also employ a motor having a single piston or diaphragm actuated in one direction by fluid-pressure against an opposing spring which moves it in the opposite direction when the fluid-pressure is withdrawn.

To insure the operation of the controller within the desired limits as to variation of pressure, the piston $b$ must be made to work with freedom and certainty at all times. With this end in view said piston is provided with a cupped leather packing which has a narrow bearing-surface in contact with cylinder B, and this packing is kept soft and pliable by filling the outer end of said cylinder with oil. This is effected by making the passage $j$ open into the top of the cylinder, as shown in Figs. 1 and 5, so as to retain the oil therein, and by providing a filling-opening and a cap or plug $c^3$ in the top of said cylinder, as shown in Fig. 1.

I claim—

1. In a controller for electrically-actuated compressors, the combination of a switch to be located in the circuit of the electric motor, a fluid-motor for operating said switch, a valve for controlling the admission and release of the actuating fluid to and from said fluid-motor, comprising a valve-seat which has a central supply port or passage, two service-ports and two exhaust-ports, and a valve-disk which has an axial supply-passage in full and constant communication with the supply-passage in said seat, two through-ports arranged to register alternately with the service-ports in said seat, and two cavities arranged to connect the associated service and exhaust ports in said seat alternately, and a fluid-motor for operating said valve having a fluid-supply connection for the compressor, substantially as and for the purposes set forth.

2. In a controller for electrically-actuated compressors, the combination of a switch to be located in the electric-motor circuit, a fluid-motor for operating said switch, consisting of two cylinders closed at their outer ends and open at their inner ends which are presented toward each other, and of two pistons fitted to work in the respective cylinders and connected by a rod upon which the movable part of the switch is mounted, a rotary valve controlling the admission and release of the actuating fluid to and from the outer ends of said cylinders, a fluid-motor for operating said valve, a blast-passage having a discharge-orifice directed toward the contacts of the switch, a valve normally closing said passage, and adapted to be momentarily opened by the switch-operating motor whenever the contacts of the switch are separated in opening the switch, and a constantly-open fluid-supply connection to lead from the compressor to said valve-operating motor and to the valve controlling the blast-passage, substantially as and for the purposes set forth.

In witness whereof I hereto affix my signature in presence of two witnesses.

NIELS ANTON CHRISTENSEN.

Witnesses:
    ALEX. A. DERUS,
    CHAS. L. GOSS.